(12) United States Patent
Huang et al.

(10) Patent No.: US 12,511,117 B2
(45) Date of Patent: Dec. 30, 2025

(54) SERVER MOTHERBOARD CONTROL METHOD

(71) Applicants: SQ TECHNOLOGY(SHANGHAI) CORPORATION, Shanghai (CN); INVENTEC CORPORATION, Taipei (TW)

(72) Inventors: Li-Hong Huang, Shanghai (CN); Huaxin Hu, Shanghai (CN); Zhenwei Li, Shanghai (CN); Hong-Chou Lin, Taipei (TW); Yu-Fan Chen, Taipei (TW)

(73) Assignees: SQ TECHNOLOGY(SHANGHAI) CORPORATION, Shanghai (CN); INVENTEC CORPORATION, Taipei (TW)

( * ) Notice: Subject to any disclaimer, the term of this patent is extended or adjusted under 35 U.S.C. 154(b) by 280 days.

(21) Appl. No.: 18/537,603

(22) Filed: Dec. 12, 2023

(65) Prior Publication Data

US 2025/0156174 A1 May 15, 2025

(30) Foreign Application Priority Data

Nov. 15, 2023 (CN) .......................... 202311526640.1

(51) Int. Cl.
*G06F 8/65* (2018.01)
(52) U.S. Cl.
CPC ...................................... *G06F 8/65* (2013.01)
(58) Field of Classification Search
CPC ....... G06F 8/65; G06F 9/44536; G06F 9/4408
See application file for complete search history.

(56) References Cited

U.S. PATENT DOCUMENTS

| 11,193,684 | B2 * | 12/2021 | Shaffer | ..................... F24F 11/32 |
| 11,836,100 | B1 * | 12/2023 | Bolen | ................. G06F 13/1684 |
| 2020/0028902 | A1 * | 1/2020 | Rajagopalan | ....... H04L 67/1051 |
| 2022/0291916 | A1 * | 9/2022 | Liu | ........................... G06F 8/65 |

FOREIGN PATENT DOCUMENTS

| CN | 105889109 A | * | 8/2016 | .......... F04D 27/007 |
| TW | 201423593 A | * | 6/2014 | |
| TW | 201514720 A | * | 4/2015 | |

* cited by examiner

*Primary Examiner* — Daxin Wu
(74) *Attorney, Agent, or Firm* — Maschoff Brennan

(57) ABSTRACT

A server motherboard control method is applicable to a system including two control components and a programmable logic component, wherein the first control component is preset to have a control right, the server motherboard control method includes: determining whether to obtain the control right from the first control component by the second control component; performing a firmware update operation on the programmable logic component by one of the first control component and the second control component that has the control right; obtaining two control signals from the first control component and the second control component respectively through two registers and comparing two pulse width modulation values of the two control signals by the programmable logic component; and transmitting one with a larger pulse width modulation value of the two control signals to a component to be controlled to control the component to be controlled by the programmable logic component.

10 Claims, 5 Drawing Sheets

SERVER MOTHERBOARD CONTROL METHOD

CROSS-REFERENCE TO RELATED APPLICATIONS

This non-provisional application claims priority under 35 U.S.C. § 119(a) on Patent Application No(s). 202311526640.1 filed in China on Nov. 15, 2023, the entire contents of which are hereby incorporated by reference.

BACKGROUND

1. Technical Field

This disclosure relates to a server motherboard control method.

2. Related Art

For a motherboard, a baseboard management controller (BMC) can be used to control multiple components. On some new architectures, two or more baseboard management controllers may be installed on one motherboard. Therefore, how to perform collaborative control with multiple baseboard management controllers on one motherboard is a problem pending to be solved in this field.

SUMMARY

Accordingly, this disclosure provides a server motherboard control method.

According to one or more embodiment of this disclosure, a server motherboard control method is applicable to a system including a first control component, a second control component and a programmable logic component, wherein the first control component is preset to have a control right, and the server motherboard control method includes: determining whether to obtain the control right from the first control component by the second control component; performing a firmware update operation on the programmable logic component by one of the first control component and the second control component that has the control right; obtaining two control signals from the first control component and the second control component respectively through two registers and comparing two pulse width modulation values of the two control signals by the programmable logic component; and transmitting one with a larger pulse width modulation value of the two control signals to a component to be controlled to control the component to be controlled by the programmable logic component.

In view of the above description, a server motherboard control method is applicable to an architecture with two baseboard management controllers on a motherboard. The two baseboard management controllers are connected to each other through specific pins and correspond to two control nodes respectively, and are switched into a control line through an arbitration component. On this basis, the present disclosure may ensure that the two baseboard management controllers do not interfere with each other when controlling the device to be controlled, and ensure that even if one of the baseboard management controllers is in a hung state, control rights can still be switched in a smooth way.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
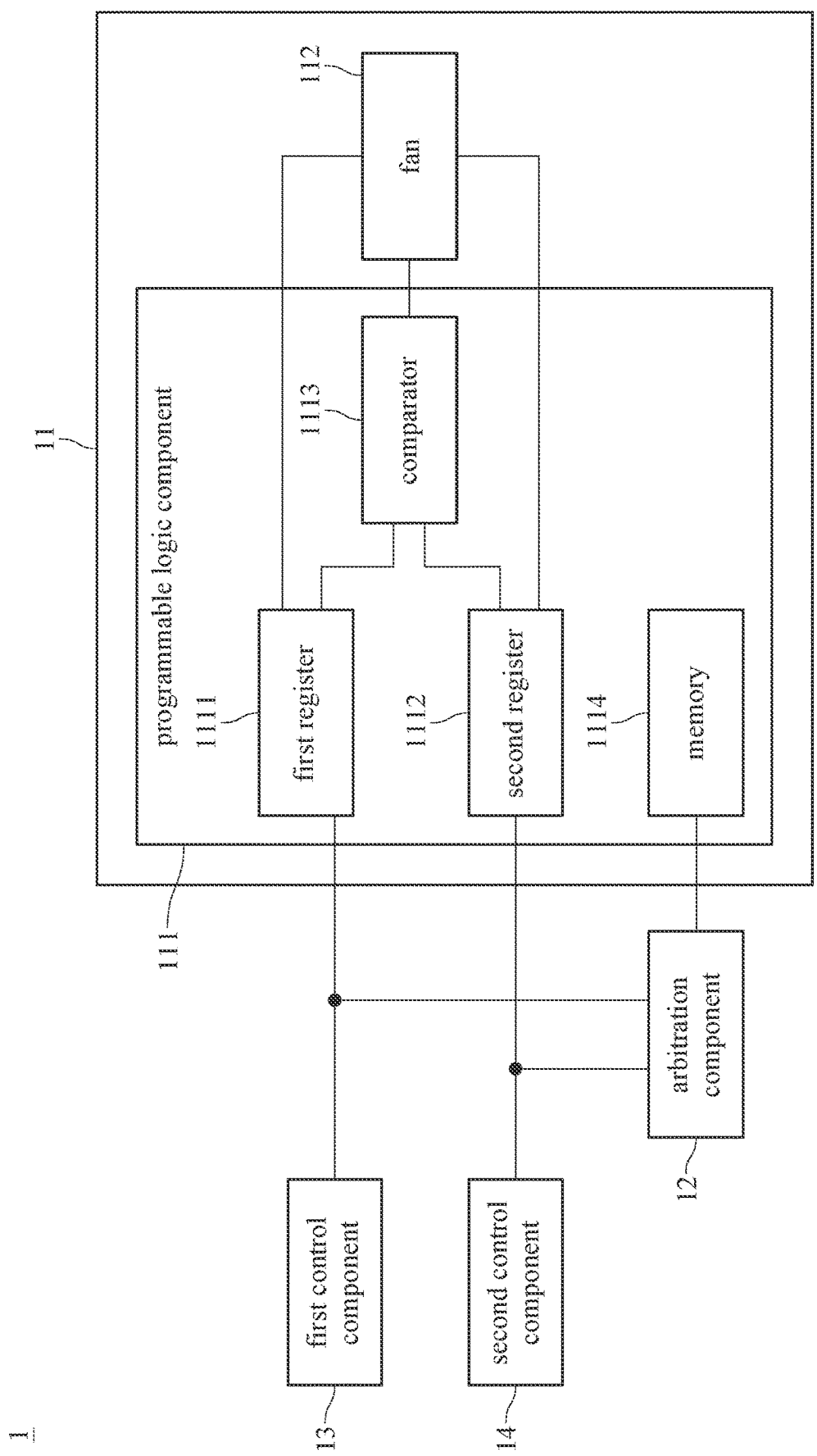
FIG. 1 is a block diagram of a system to which a server motherboard control method is applied according to an embodiment of the present disclosure.

Please refer to FIG. 1 which is a block diagram of a system to which a server motherboard control method is applied according to an embodiment of the present disclosure. As shown in FIG. 1, a server motherboard control system 1 includes a device to be controlled 11, an arbitration component 12, a first control component 13 and a second control component 14. The device to be controlled 11 includes a programmable logic component 111 and a fan 112. In the present embodiment, the device to be controlled 11 may be a device with speed control requirements, such as a cooling fan device. The programmable logic component 111 is configured to output the pulse modulation signal of the fan 112 to control the output power of the fan 112. In other embodiments, the device to be controlled 11 may also include other components other than the fan 112, which is not limited in the present disclosure. The programmable logic component 111 may be, for example, a complex programmable logic device (CPLD).

The programmable logic component 111 includes a first register 1111, a second register 1112, a comparator 1113 and a memory 1114. The first register 1111 is connected to the first control component 13 and the arbitration component 12 through a first integrated bus circuit. The second register 1112 is connected to the second control component 14 and the arbitration component 12 through a second integrated bus circuit. The comparator 1113 is connected to the first register 1111 and the second register 1112, and is configured to compare a first pulse width modulation of the first register 1111 with a second pulse width modulation of the second register 1112, and uses the larger one of the first pulse width modulation and the second pulse width modulation as the control signal of the fan 112 of the device to be controlled 11. Specifically, the memory 1114 may be a flash memory, an electronically-erasable programmable read-only memory (EEPROM), or a programmable read-only memory (PROM), etc. in the programmable logic component 111.

In the present embodiment, the arbitration component 12 may be a switching component (I2C switch) based on an integrated bus circuit, such as a PCA9641 arbitration component. The first control component 13 and the second control component 14 may be two independent baseboard management controllers (BMC). Both the first control component 13 and the second control component 14 may be configured to adjust the pulse width modulation (PWM) signal of the device to be controlled 11 to control the output power of the device to be controlled 11. Regarding the control circuit, the first control component 13 and the second control component 14 respectively belong to different control nodes. The first control component 13 and the second control component 14 are switched into one control circuit through the arbitration component 12. Specifically, the first control component 13 may be connected to the arbitration component 12 through a first integrated bus circuit (Inter-Integrated Circuit, I2C), the second control component 14 may be connected to the arbitration component 12 through a second integrated bus circuit, and the arbitration component 12 may be connected to the device to be controlled 11 through a third integrated bus circuit.

Figure 2:
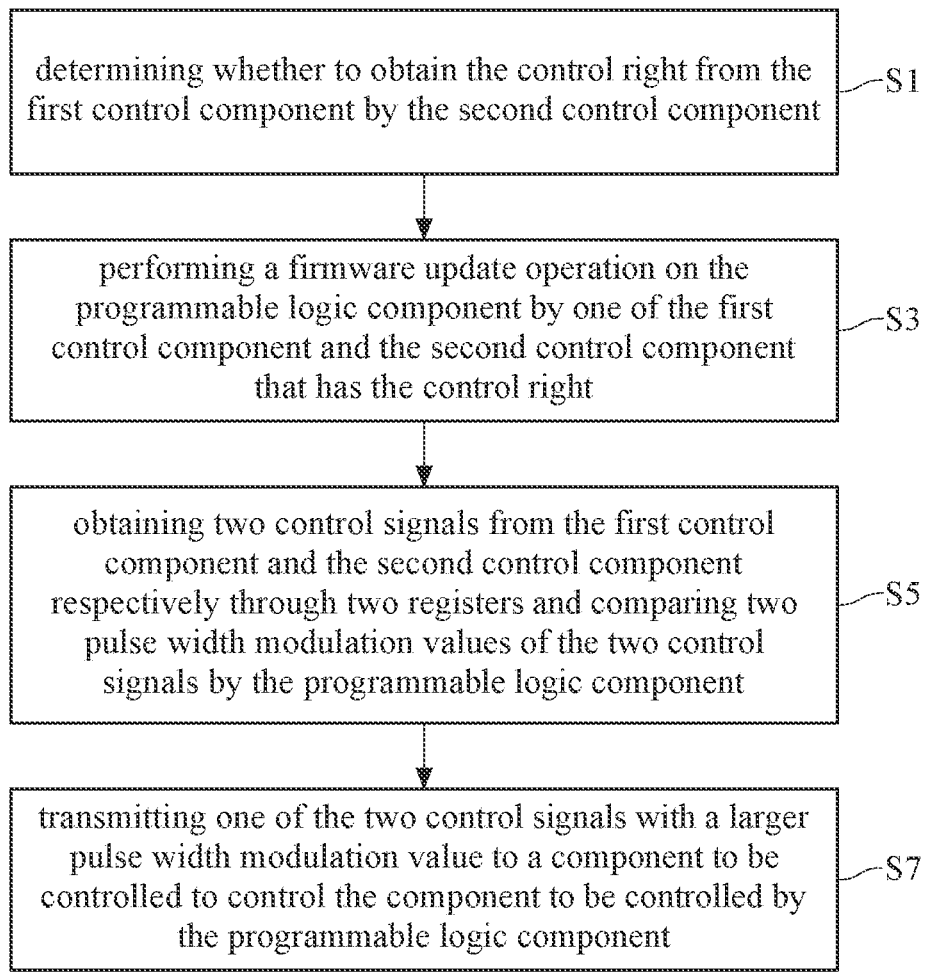
FIG. 2 is a flow chart of a server motherboard control method according to an embodiment of the present disclosure.

Please refer to FIG. 2 along with FIG. 1, FIG. 2 is a flow chart of a server motherboard control method according to an embodiment of the present disclosure. As shown in FIG. 2, the server motherboard control method includes step S1: determining whether to obtain the control right from the first control component by the second control component; step S3: performing a firmware update operation on the programmable logic component by one of the first control component and the second control component that has the control right; step S5: obtaining two control signals from the first control component and the second control component respectively through two registers and comparing two pulse width modulation values of the two control signals by the programmable logic component; and step S7: transmitting one of the two control signals with a larger pulse width modulation value to a component to be controlled to control the component to be controlled by the programmable logic component.

Figure 3:
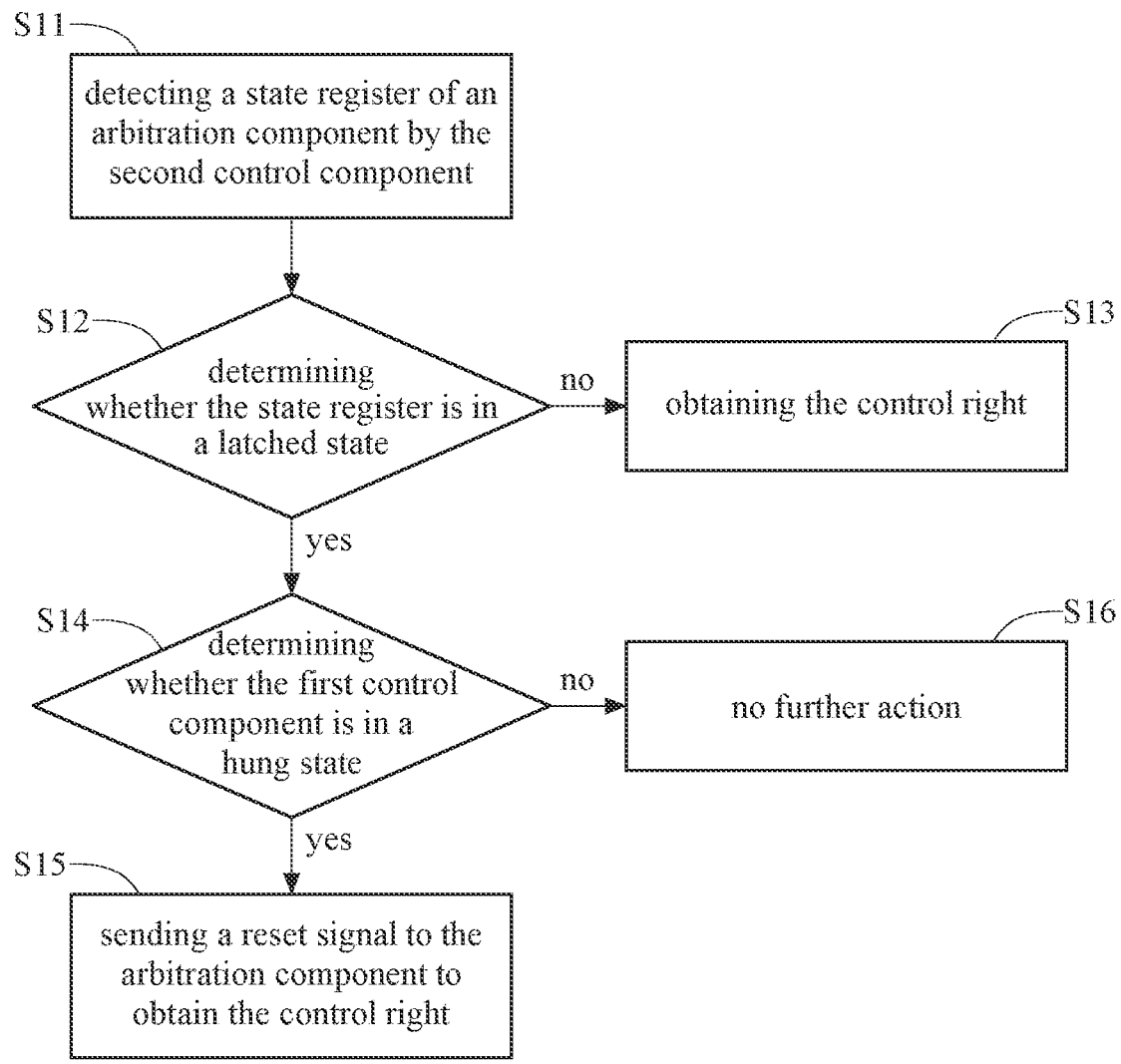
FIG. 3 is a flow chart of switching control right of a server motherboard control method according to an embodiment of the present disclosure.

In the present embodiment, the first control component 13 is preset to have a control right, so in step S1, the second control component 14 determines whether to obtain the control right from the first control component 13. Specifically, please refer to FIG. 3 which is a flow chart of switching control right of a server motherboard control method according to an embodiment of the present disclosure. As shown in FIG. 3, the step S1 shown in FIG. 2 may include step S11: detecting a state register of an arbitration component by the second control component; step S12: determining whether the state register is in a latched state; if the state register is not in the latched state, executing step S13: obtaining the control right; if the state register is in the latched state, executing step S14: determining whether the first control component is in a hung state; if the first control component is in a hung state, executing step S15: sending a reset signal to the arbitration component to obtain the control right; if the first control component is not in a hung state, executing step S16: no further action.

Referring to FIG. 1, in steps S11 and S12, the second control component 14 may detect whether a state register of the arbitration component 12 is in a latched state. If the state register is in the latched state, the second control component 14 is unable to directly obtain the control right currently. Specifically, the state register of the arbitration component 12 corresponds to the address 02h Bit0, and the latched state corresponds to the data value of 02h Bit0 being "0", and the non-latched state corresponds to the data value of 02h Bit0 being "1". In step S13, when the second control component 14 determines that the state register of the arbitration component 12 is not in the latched state, the second control component 14 is able to directly obtain the control right. In steps S14 and S15, when the second control component 14 determines that the first control component is in a hung state, the second control component 14 may pull the reset pin of the arbitration component 12 to reset the arbitration component 12 and switch to the non-latched state, thereby obtaining the control right. In contrast, in steps S14 and S16, when the second control component 14 determines that the first control component is not in a hung state, indicating that the first control component 13 is in a normal operating state and occupies the control line of the arbitration component 12, then the second control component 14 does not execute further action.

After the above step S1, one of the first control component 13 and the second control component 14 may obtain the control right. Then, in step S3, the control component that has obtained the control right may perform a firmware update operation on the programmable logic component 111. For example, the control logic of the comparator 1113 comparing the first pulse width modulation and the second pulse width modulation of the first register 1111 and the second register 1112 may be written in the memory 1114. In step S5, the programmable logic component 111 may obtain two control signals from the first control component 13 and the second control component 14 respectively through the first register 1111 and the second register 1112, and compare the pulse width modulation values of the two control signals. In step S7, the programmable logic component 111 may use a signal with a larger pulse width modulation value as a control signal for the component to be controlled (fan 112).

Figure 4:
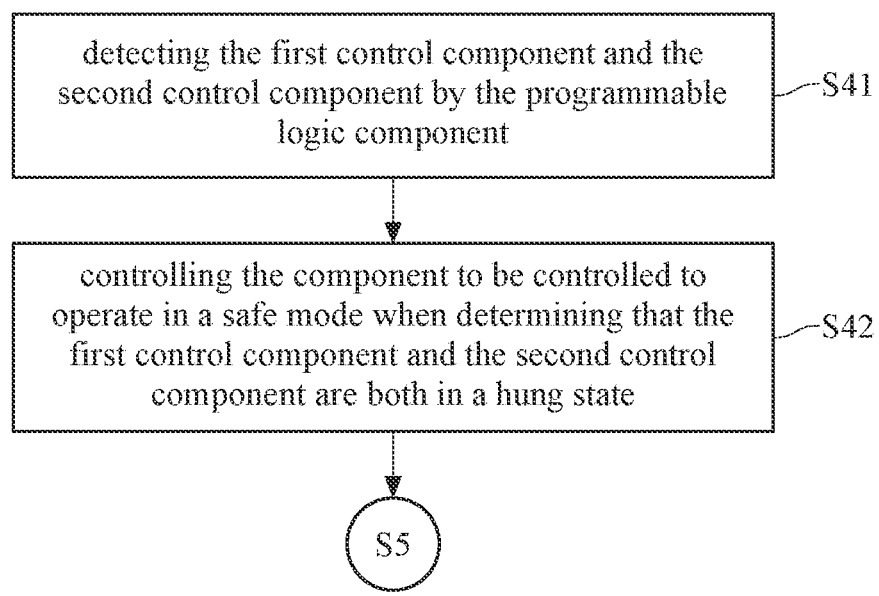
FIG. 4 is a flow chart of a server motherboard control method according to another embodiment of the present disclosure.

Please refer to FIG. 4 which is a flow chart of a server motherboard control method according to another embodiment of the present disclosure. As shown in FIG. 4, in the present embodiment, before step S5, the server motherboard control method may further include: step S41: detecting the first control component and the second control component by the programmable logic component; and step S42: controlling the component to be controlled to operate in a safe mode when determining that the first control component and the second control component are both in a hung state. Regarding the above embodiments, when the first control component 13 or the second control component 14 is in the hung state, the other control component can switch the arbitration component 12 to obtain the control right. Furthermore, when both the first control component 13 and the second control component 14 are in the hung state, the programmable logic component 111 may directly control the component to be controlled (fan 112) to operate in a safe mode, such as operating at a preset operating speed.

Figure 5:
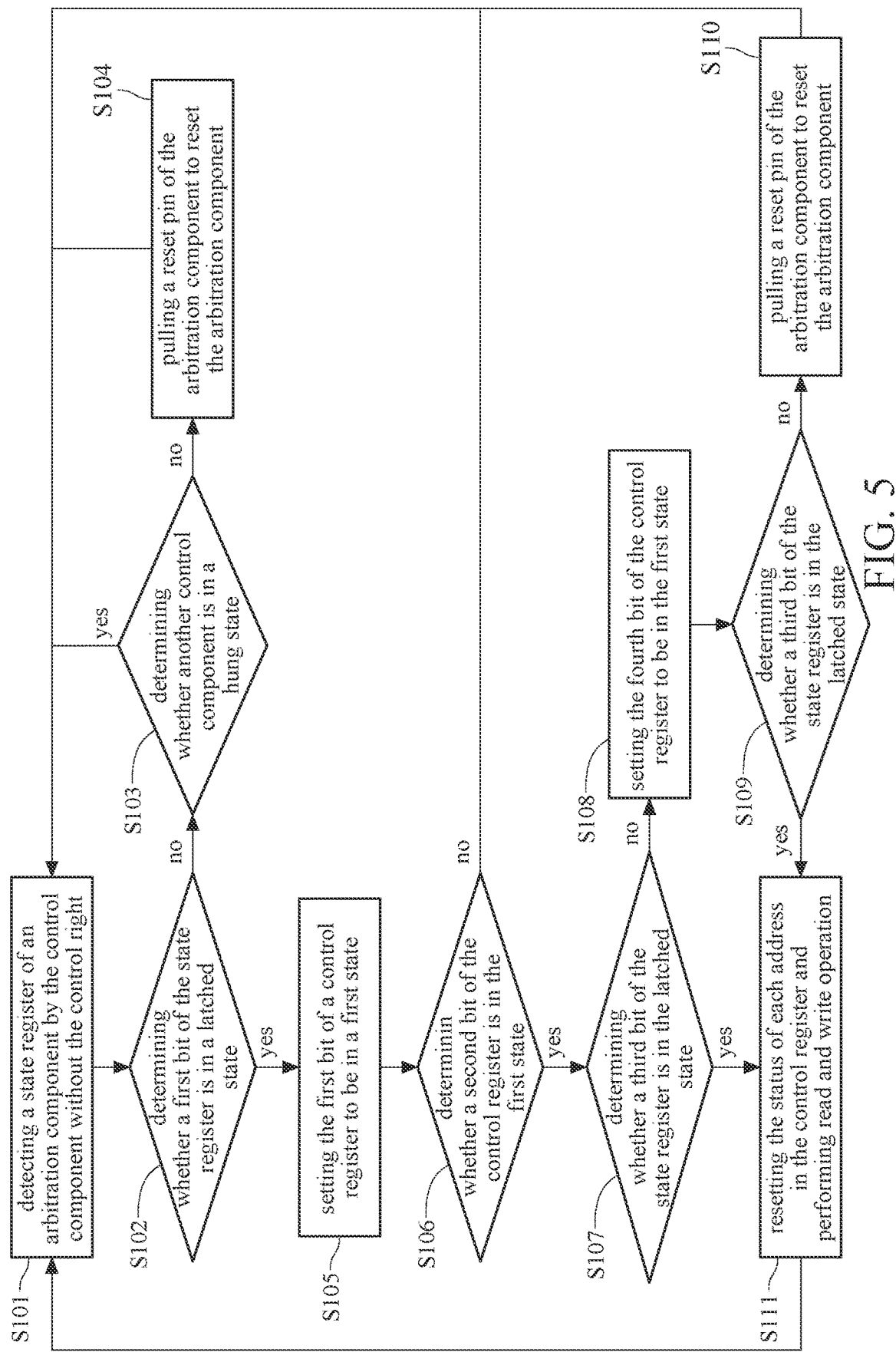
FIG. 5 is a flow chart of a server motherboard control method according to still another embodiment of the present disclosure.

Please refer to FIG. 5 along with FIG. 1, FIG. 5 is a flow chart of a server motherboard control method according to still another embodiment of the present disclosure. As shown in FIG. 5, the server motherboard control method may include steps S101 to S111.

In step S101, the first control component 13 or the second control component 14 may be set to have control right by the system, and the other one may detect a state register of the arbitration component 12. Specifically, the first control component 13 may be preset to have access to the first register 1111, while on the other hand, the second control component 14 does not have access to the second register 1112. Step S101 may correspond to step S11 in FIG. 2. In step S102, the control component without control right may determine whether the first component of the state register of the arbitration component 12 is in the latched state. Specifically, the first bit of the state register may correspond to bit Bit0 at address 02h. If the result of step S102 is no, step S103 is executed; if the result of step S102 is yes, step S105 is executed. Step S102 may correspond to step S12 in FIG. 2. In step S103, a control component without control right may determine whether another control component is in a hung state. If the result of step S103 is no, step S104 is executed. Step S103 may correspond to step S13 in FIG. 2. In step S104, the control component without control right may pull the reset pin of the arbitration component 12 to reset the arbitration component 12. After step S104, the control component without control right may rest for a first predetermined time and then re-execute step S101. In step S105, the control component without control right may set the first bit of a control register to be in a first state. For example, for the first control component 13, the control register is the first register 1111, and for the second control component 14, the control register is the second register 1112. Specifically, the first bit of the control register corresponds to bit Bit0 at address 01h, and the first state corresponds to the data value of bit Bit0 at address 01h being "1", and the second state corresponds to the data value of bit Bit0 at address 01h being "0". In step S106, the control component without control right may determine whether the second bit of the control register is in the first state. That is, after obtaining the control right, the control component may further confirm whether the control right is successfully obtained according to first data in the control register. Specifically, the second bit of the control register may correspond to bit Bit1 at address 01h.

If the result of step S106 is no, the control component without control right may rest for the first predetermined time and then execute step S101 again; if the result of step S106 is yes, step S107 is executed. In step S107, the control component without control right may determine whether the third bit of the state register is in the latched state. Specifically, the third bit of the state register may correspond to bit Bit2 at address 02h. If the result of step S107 is no, step S108 is executed; if the result of step S107 is yes, step S111 is executed. In step S108, the control component without control right may set the fourth bit of the control register to be in the first state. Specifically, the fourth bit of the control register may correspond to bit Bit3 at address 01h. In step S109, the control component without control right may determine whether the third bit of the state register is in the latched state. Specifically, the third bit of the state register may correspond to bit Bit2 at address 02h. If the result of step S109 is no, step S110 is executed; if the result of step S109 is yes, step S111 is executed. In step S110, the control component without control right may pull the reset pin of the arbitration component 12 to reset the arbitration component. That is, in steps S107 to S110, the control component without control right may further execute: detecting second data in a state register; determining whether an inter-integrated circuit connected between the first control component 13, the second control component 14, the programmable logic component 111 and the arbitration component 12 is in a hung state according to the second data; resetting the inter-integrated circuit when determining that the inter-integrated circuit is in the hung state; and using an external reset pin to reset the arbitration component when the inter-integrated circuit cannot be reset. After step S110, the control component without control right may rest for a first predetermined time and then re-execute step S101.

In step S111, the control component without control right may reset the status of each address in the control register and perform read and write operation. Specifically, the control component without control right may set the third bit of the control register (Bit2 at address 01h) to be in the first state, and perform upgrade and read and write operation on the programmable logic component 111 through the inter-integrated circuit, and then set the third bit (Bit2 at address 01h) and the first bit (Bit0 at address 01h) of the control register to be in the second state, that is, clear the data in the control register. Step S111 may correspond to step S3 in FIG. 2. After step S111, the control component may rest for a second predetermined time and then re-execute step S101. For example, the first control component 13 is preset to have a control right, and after the second control component 14 obtains the control right, the first control component 13 may determine whether to obtain control right from the second control component when re-executing step S101. The first predetermined time described above may be associated with the time required to read another control component to determine whether said another control component is in a hung state, and the second predetermined time may be associated with the cycle time of reading the register. For example, the first predetermined time may be 10 milliseconds, and the second predetermined time may be 1 second. In addition, the server motherboard control method may further include executing with a control component having the control right: connecting a third address of the control register with the inter-integrated circuit.

In view of the above description, a server motherboard control method is applicable to an architecture with two baseboard management controllers on a motherboard. The two baseboard management controllers are connected to each other through specific pins and correspond to two control nodes respectively, and are switched into a control line through an arbitration component. On this basis, the present disclosure may ensure that the two baseboard management controllers do not interfere with each other when controlling the device to be controlled, and ensure that even if one of the baseboard management controllers is in a hung state, control rights can still be switched in a smooth way. In addition, by using two baseboard management controllers to read the power consumption of a programmable logic component and perform online update of the programmable logic component, the overall configuration can be further simplified.

What is claimed is:

1. A server motherboard control method, applicable to a system comprising a first control component, a second control component and a programmable logic component, wherein the first control component is preset to have a control right, and the server motherboard control method comprises:

determining whether to obtain the control right from the first control component by the second control component;

performing a firmware update operation on the programmable logic component by one of the first control component and the second control component that has the control right;

obtaining two control signals from the first control component and the second control component respectively through two registers and comparing two pulse width modulation values of the two control signals by the programmable logic component; and transmitting one of the two control signals with a larger pulse width modulation value to a component to be controlled to control the component to be controlled by the programmable logic component.

2. The server motherboard control method of claim 1, further comprising:
- detecting the first control component and the second control component by the programmable logic component; and
- controlling the component to be controlled to operate in a safe mode when determining that the first control component and the second control component are both in a hung state.

3. The server motherboard control method of claim 1, wherein determining whether to obtain the control right from the first control component by the second control component comprises:
- detecting whether a state register of an arbitration component is in a latched state; and
- obtaining the control right when detecting that the state register is not in the latched state.

4. The server motherboard control method of claim 3, wherein determining whether to obtain the control right from the first control component by the second control component further comprises:
- determining whether the first control component is in a hung state when detecting that the state register is in the latched state; and
- sending a reset signal to the arbitration component to obtain the control right when determining that the state register is in the latched state and the first control component is in the hung state.

5. The server motherboard control method of claim 3, after obtaining the control right, further comprising:
- confirming whether the control right is successfully obtained according to first data in a control register.

6. The server motherboard control method of claim 3, further comprising executing by the second control component:
- detecting second data of a state register;
- determining whether an inter-integrated circuit connected between the first control component, the second control component, the programmable logic component and the arbitration component is in a hung state according to the second data; and
- resetting the inter-integrated circuit when determining that the inter-integrated circuit is in the hung state.

7. The server motherboard control method of claim 6, further comprising executing by the second control component:
- using an external reset pin to reset the arbitration component when the inter-integrated circuit cannot be reset.

8. The server motherboard control method of claim 7, further comprising executing by the second control component:
- connecting a third address of the control register to the inter-integrated circuit.

9. The server motherboard control method of claim 8, further comprising executing by the second control component:
- performing a read and write operation through the inter-integrated circuit.

10. The server motherboard control method of claim 9, further comprising executing by the second control component:
- clearing data in the control register,
- and the server motherboard control method further comprising:
- determining whether to obtain the control right from the second control component by the first control component.

* * * * *